United States Patent Office 3,410,923
Patented Nov. 12, 1968

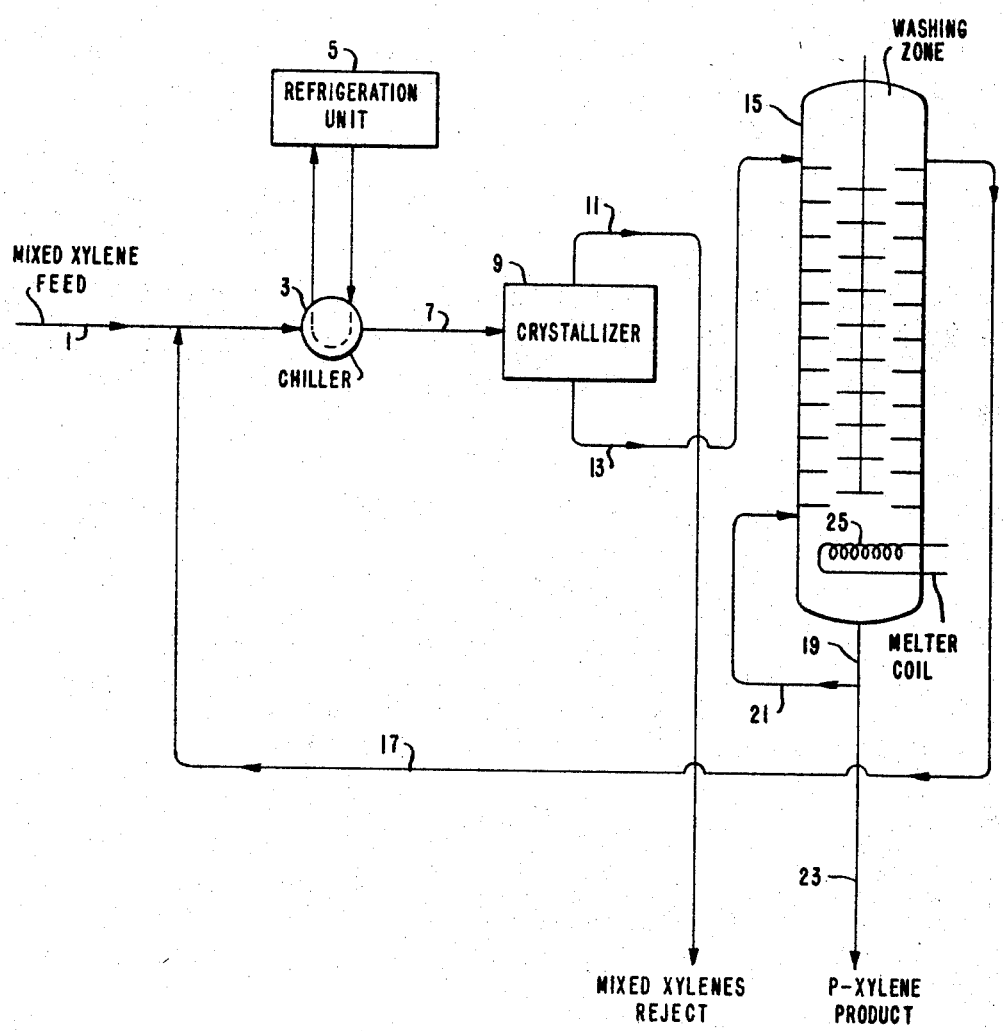

3,410,923
SEPARATION PROCESS
Carl P. Strand and Gordon D. Towell, El Cerrito, Calif., assignors to Shell Oil Company, New York, N.Y., a corporation of Delaware
Filed Dec. 4, 1963, Ser. No. 327,885
15 Claims. (Cl. 260—674)

This invention relates to a process for the separation of a crystalline product in high purity from a multicomponent system. More particularly, the invention pertains to a method for the recovery of high purity paraxylene from the products produced by the dehydrocoupling and cycling of lower aliphatic hydrocarbons, or from the xylene containing mixture obtained as platformate from a platforming operation.

Aromatics compounds in high yields may now be produced by dehydrogenating and cyclizing simple aliphatic hydrocarbons by techniques described in U.S. Patent No. 3,080,435, issued March 5, 1963 to Maxwell Nager and application No. 252,051, filed January 17, 1963 now U.S. Patent No. 3,168,584, issued February 2, 1965 to the same inventor. By the conversion processes therein described it is possible to manufacture aromatic compounds such as benzene, naphthalenes, xylenes, and toluene by contacting $C_3$, $C_4$, or $C_5$ acrylic hydrocarbons or mixtures composed of two or more of these types of compounds and oxygen with a molten alkali metal iodide to simultaneously dehydrogenate, couple, cyclize, and aromatize the simpler hydrocarbons to aromatic compounds.

While these techniques are particularly outstanding in that they are effective to produce aromatic hydrocarbons directly from $C_3$ to $C_5$ aliphatic hydrocarbons with virtual exclusion of the production of other less desirable compounds such as polyolefins and tar-like materials produced by other prior art methods, the production of a particular aromatic compound such as p-xylene by iodative (iodinative) dehydrogenation and coupling of isobutane sometimes results in a product which contains small amounts of metaxylene or other alkylbenzene products, even though the purity of the final p-xylene product is usually superior to the purity of xylenes produced by conventional means. Also trace amounts of iodides may be present which cause the resulting product specification for paraxylene to be exceeded.

The commercial need for extremely high purity (e.g., in excess of 99% and preferably above 99.2%) paraxylene is recognized. The reason for this need is at least partly based on the fact the paraxylene product is used as an intermediate which is converted to methyl terephthalate which, in turn, is used to prepare polyethylene terephthalate polymers useful as synthetic fibers and films. Another use of high purity paraxylene is in the production of dimethyl terephthalate via oxidation to terephthalic acid and esterification with methanol. The use of higher purity paraxylene starting material results in the production of these derivatives in a much more pure state. Moreover, even very small amounts of certain impurities may effect the color qualities of the polymers which are derived from the xylenes, and in some cases may even upset the catalyst systems used to make the polymers.

Now, in accordance with one embodiment of the instant invention, a continuous process for the recovery of extremely high purity paraxylene is achieved by subjecting the aromatics containing multicomponent mixture produced from a dehydrocoupling and cyclizing conversion step or from a conventional platforming operation to a novel purification scheme.

In one aspect, the instant invention involves a process for recovering high yields of paraxylene having a purity in excess of 99% (in fact, from 99.8 to 99.9% paraxylene purity is rather easily obtained) from a hydrocarbon feed fraction comprising paraxylene and at least one other xylene isomer which comprises cooling the fraction in a cooling zone to a temperature below that at which crystals of paraxylene form for a time sufficient to form a slurry comprising a mixture of a solid crystal phase and a liquid phase, separating at least part of said liquid phase from the slurry to form a reject stream, passing the remainder of said slurry containing some residual contaminating liquid from said feed to a washing zone wherein melt is refluxed countercurrently to the downward direction of flow of said solid phase in a series of subzones wherein the flow pattern of the crystal slurry and refluxed melt in each of said subzones is toroidal, obtaining overhead a stream comprising washing liquid and contaminating liquid, recycling said overhead stream to said cooling zone, heating washed solid phase to form a liquid melt, recycling part of said liquid melt to serve as washing liquid, and recovering the remainder of said liquid melt as high purity paraxylene.

In another aspect, the process of the instant invention involves the technique described above except that, instead of employing liquid melt (i.e., produced by melting essentially pure product crystals) as reflux, an extraneous substance not normally present in the feed such as an inert solvent may be employed in back washing the crystals in the washing zone. Thus, in the case wherein paraxylene is to be recovered, it is sometimes desirable to employ a washing liquid which may be selected from a large number of substances so long as three requirements are met. These requirements are: (1) that the washing liquid does not dissolve (i.e., is substantially insoluble with) paraxylene, (2) the washing liquid is one which has a density different from xylene, by an amount of at least about .2 gram per cubic centimeter, and (3) that the washing liquid has a low viscosity, i.e., below about 10 centipoises and preferably less than 1 centipoise.

Although many substances are suitable for this purpose, low molecular weight hydrocarbons such as ethane, ethylene, propylene, propane, butane, pentane, isopentane and the like are particularly desirable. Also certain low molecular weight oxygenated compounds such as acetone, etc. may be used. Also mixtures of the above compounds may be employed as the washing liquid so long as the three essential characteristics described are met by the mixture.

The employment of an extraneous solvent has the advantage that it may be selected so that it has a lower density and viscosity than that of the melt and thus have the ability to increase the settling rate in the washing zone. This property, of course results in reduced size of equipment for the washing zone. Another advantage is a reduction in refrigeration load since use of the solvent obviates the need to melt reflux from the product crystals. Finally, the use of a properly selected solvent as the washing liquid will result substantially in the elimination of a temperature gradient in the operation of the washing zone. Also the solvent may be used to effect cooling in the formation of crystals by contacting the feed and evaporating the solvent.

When an extraneous solvent is employed as the washing liquid it is apparent that additional separation facilities, usually fractional distillation zones, must be employed to recover the solvent from the final product stream and from the reject or raffinate stream from the washing zone so that the solvent may then be recycled to the process and the product recovered in its desired degree of purity.

The employment of a toroidal flow pattern in the washing zone is believed to achieve a stirring effect wherein separate particle contacting is maximized. This effect is one reason why such high purities are economically achieved. It is essential in this technique that the individual crystalline particles are not intentionally compacted or permitted to agglomerate, but rather are kept as nearly as possible separate and distinct so that they are most efficiently contacted with washing liquid.

The means for imparting the toroidal flow pattern in the important washing stage of the process is desirably a rotating disc contactor as described in U.S. Patent 2,601,674 to Reman, issued June 24, 1952. Preferably, the rotating disc contacting zone comprises a cylindrical column consisting of a number of compartments formed by a series of stator rings, with a rotating disc centered in each compartment and supported by a rotating shaft. The feed inlet is preferably arranged tangentially in the direction of shaft rotation. Rotor operation first produces a rotation of the whole mass of liquid and crystals, wherein the mixture is forced to the wall of the compartment by centrifugal action of the rotor discs.

The direction of flow is then reversed near the stator discs in the direction of the axis. The combination of these rotational, centrifugal, and centripetal flows results in a motion which is called toroidal flow. Of course, the countercurrent flow of the liquid melt phase or solvent reflux and the crystal phase is superimposed on this toroidal motion; however, its effect on the flow pattern within the contacting compartment is small. The toroidal motion is discussed further and illustrated in the drawings of U.S. 2,601,674, the disclosure of which is herein-incorporated and made part of this disclosure.

In the operation of the washing step, the paraxylene crystals containing some mother liquor are introduced into the upper portion of the washing contacting zone and the crystals flow downwardly through a series of sub-zones wherein the surfaces of the downwardly flowing crystals having occlusions and adulterating substances which may be present thereon washed away by contact with upwardly flowing washing liquid which initially comprises 99% to 99.9% by weight of pure paraxylene liquid when melt is employed for this purpose. The hold-up of crystals in the washing zone will usually be maintained between 5 and 35%, preferably 10–20% by volume. Rotation of the rotor causes the slurry to become intimately contacted with the washing liquid, with variations of the rotor speed providing a means of controlling the extent and rate at which the descending crystals are washed.

The resultant flow pattern of the washing liquid and crystal slurry in the washing zone is complex and is controlled mainly by rotor operation. That is, the speed of rotation of the rotor is also important in the sense that if the speed is too slow, crystals tend to pile up on the stator and rotor, whereas if the speed is too fast the crystals break up into smaller particles and fines which are very harmful in that the settling rate is drastically reduced, too much axial mixing occurs, and an overall reduced efficiency results.

While the flow of solids is downward in the case described because the crystals are heavier than the liquids, it will be apparent that this is because of the relative densities of the solid and liquid phases. However, it is obvious that in some situations wherein the instant process might be applied, the solid floats (e.g., ice/salt water). The slurry is then fed to the bottom of the washing zone and the washing liquid fed from the upper portion downward.

The particle size of the crystals should be as large as possible. Small particles have proportionately more surface area, making them more difficult to wash; also they settle slowly so that capacity of equipment is low. For the paraxylene case, the minimum particle size should be approximately greater than 0.3 millimeter in diameter.

While the previous discussion has emphasized purification of paraxylene from various feed mixtures such as a hydrocarbon platformate fraction, and a feed prepared from the dehydrocoupling and cycling of lower aliphatic hydrocarbons, other crude xylene mixtures may be separated, such as solvent naphtha containing xylene and the like. Moreover, feeds in which the amount of paraxylene is present in amounts from 9–98% by weight are suitable. Also other types of multicomponent mixtures wherein the mixture of components is capable of establishing solid and liquid phases in equilibrium with each other and in which mixture a change in temperature causes a change in the composition of each phase to restore equilibrium may generally be separated or purified. Examples of such feeds which are suitable for the instant separation technique are sea water (for desalination); aqueous solutions of hydrogen peroxide; mixtures of homologues of pyridines, fruit juices (for concentration), sugar purification, etc.

The temperatures and pressures employed may vary within wide ranges depending upon the system and phase equilibria involved. However, in the case where paraxylene is recovered the temperature of the chiller and crystallizer is usually from about 0 to −90° C. Similarly the washing zone is operated usually so that the top is maintained at from 0 to −90° C. with the bottom approximately at 13° C. Pressures are usually between about atmospheric and 50 pounds per square inch gauge, although higher and lower values may be utilized in certain situations.

One of the principal advantages of the process of the instant invention with its efficient washing step is the fact that it is possible to obtain very high purities although eliminating several stages of crystalliaztion and centrifuging which normally accompany commercial crystallization purification operations.

The attached drawing illustrates a preferred embodiment of the invention wherein paraxylene is recovered from a mixed meta- and paraxylene feed.

Referring to the drawing, there is shown a system which utilizes a chiller 3, a crystallizer 9, and a washer 15. In this embodiment the chiller cools the mixed xylene feed down so that the crystals of pure paraxylene in suspension with mother liquor will form in the crystallizer and the crystals present in the crystal/mother liquor slurry which is formed in the crystallizer are washed and then melted in the washing zone. The mixed xylene feed is passed into the system by means of line 1 and is introduced into the chiller 3 which is merely a heat exchanger which has cold supplied by means of refrigeration unit 5. The cooled feed changes into a slurry of crystals of paraxylene in mother liquor in crystallizer 9 and a reject liquid comprising a major amount of metaxylene but with some paraxylene is drawn off via line 11.

The liquid reject phase may be removed directly from a suitable settling zone (in which crystals settle out by gravity) in the crystallization tank. The slurry can contain any convenient liquid content (again produced by simple sedimentation), with excess returning to the chiller via the top of the washing zone. This separation of course, also could be achieved by a filter, hydroclone, etc. as well as a conventional settler.

The crystal slurry is transported through line 13 to the upper portion of the washing zone 15 wherein, after countercurrent washing of the descending crystals and melting at lower portion by means of heat introduced from the melting coil 25, a melted stream comprising substantially pure product is drawn off via line 19. A portion of the pure product is returned in line 21 to the lower portion of the washing zone where it is used as the washing liquid for removing surface impurities and occlusions from the settling crystals. The remainder of the pure product is recovered from the process through line 23.

It will be recognized, of course, that the drawing is merely representative of one preferred schematic flow arrangement, and that the auxiliary apparatus employed in this process may be any conventional or convenient type known to those skilled in the art. For simplicity, the drawing does not show all the pumps, tanks, heat exchangers, valves, by-passes, vents, reboilers, condensers, coolers, and other auxiliary equipment that may be necessary for the proper operation of the process but the inclusion of which will be evident to those skilled in the art. For example, it will be readily apparent that the heating element shown in the washing column in the drawing might also be located externally with respect to the column. Moreover, the particular type of crystallizer may be any conventional type, stirred tank, scraped surface, etc.

Although not shown in the drawing, the crystallizer should preferably have a means of classifying crystals so that only ones above a desired size are taken out. This keeps the "fines" or undersized crystals out of the washing zone which is important since their presence otherwise tends to cause flooding. Another way to do this is to install an elutriator between crystallizer and washing zone, or even employ such an expedient in the washing zone itself.

Essential, however, to the mode of operation of the instant process is the employment of a washing zone comprising means suitable for imparting the toroidal flow pattern to the washing of the crystals. While this is desirably achieved by means of a rotating disc contactor, other columns having a rotating member or members with some type of baffling arrangement may be employed if capable of imparting the particular toroidal flow pattern.

Although the reflux ratio may vary somewhat depending upon crystal size, settling velocity, and size of the washing zone; for the paraxylene case employing particles having a diameter of at least about .3 millimeter, a backwash to product weight ratio of at least about 2/3 or higher is more preferred.

EXAMPLE I

A mixed xylene feed at a temperature of 100° F. and at atmospheric pressure and produced by iodative dehydrogenation and coupling of isobutane and comprising 95% by weight p-xylene and 50% by weight metaxylene is pumped at 1394 pounds per hour to a chiller maintained at −5° F. to chill the feed to 11° F. The chilled feed is then passed to a one-stage crystallizer wherein a 50% (volume fraction of solids) slurry of crystals in mother liquid is formed. About 144 pounds per hour of reject liquid is separated from the slurry formed in the crystallizer. The reject liquid contains about 48.7% by weight of metaxylene. The 50% slurry is introduced into the upper portion of a rotating disc contactor (having a heating coil located in the lower portion thereof) wherein the downwardly flowing crystals are countercurrently contacted with a rising stream of wash liquid which removes mother liquor and occluded impurities from the crystals. About 4375 pounds per hour of a liquid overhead containing about 70.3% paraxylene at a temperature of 31° F. is recycled from the upper portion of the rotating disc contactor to the initial feed mixture for introduction into the crystallizer. Near the bottom of the column the internal heating coil melts the washed crystals and 1250 pounds per hour of liquid product comprising 99.5% by weight of paraxylene is withdrawn at a temperature of 55° F.

EXAMPLE II

A feed stream comprising 83% by weight para and 17% by weight metaxylene is passed into a scraped-surface chiller wherein the stream is cooled to a temperature so that initial crystal formation occurs. From the chiller the crystal-mother liquor slurry is passed to a surge and crystal growth tank, where it is retained for a time sufficient to produce a slurry having about 50% by weight crystal content wherein the average crystal size is about .3 to .4 millimeter in diameter. The slurry containing most of the crystals, after first separating a substantial part of the mother liquor by a conventional separator, are fed to a rotating disc contactor having a two inch diameter and a length of ten feet at a feed rate of about 210 cubic centimeters per minute. The descending crystals are countercurrently washed in the rotating disc contactor by an upflowing stream of melt wash comprising initially 99.9% pure paraxylene with a reflux weight ratio of melt wash to crystals of 0.65:1. The melt p-xylene is recovered as the product of the process after passing the melter located in the bottom portion of the column at a rate of about 35 cubic centimeters per minute and has a product purity of 99.9% by weight paraxylene.

EXAMPLE III

Paraxylene is recovered from a 95% paraxylene, 5% metaxylene mixture and purified to 99.5% purity while producing a raffinate containing 50% paraxylene. The recovery of paraxylene in the product is greater than 95%. Product purity is obtained by countercurrent washing of paraxylene crystals in a rotating disc contactor, which operates in the temperature range from 13° C. at the bottom to 4° C. at the top. The crystals settle through the wash column and, after melting, 58% of the crystal flow at the bottom is withdrawn as product. The remaining melted crystals are sent back up the wash column as wash liquid. The 95% paraxylene feed mixture (100 pounds per minute at 11° C.) enters the rotating disc contactor at an appropriate level and serves as a secondary wash liquid. From the top of the washing column a liquid containing 78.8% paraxylene is withdrawn at the rate of 233 pounds per minute and is sent to a crystallization apparatus where crystallization at −12.5° C. produces a crystal-mother liquor slurry. The mother liquor contains 50% paraxylene. The slurry thus produced, as a 60% crystal-40% mother liquid mixture, is sent to the top of the rotating disc contactor at the rate of 224 pounds per minute, as the crystal feed to the washing process. A mother-liquid stream is also withdrawn from the crystallization apparatus as the process raffinate, at the rate of 9 pounds per minute.

EXAMPLE IV

A mixture obtained by suitable fractionation of the product from a platforming operation and containing 18% paraxylene, is cooled to −75° C. at the rate of 100 pounds per minute. The crystal slurry thus produced is sent to the top of a rotating disc contactor operating essentially isothermally at about −75° C., where the crystals settle countercurrently through a wash liquid. The wash liquid is isopentane. From the bottom of the rotating disc contactor a crystal slurry is withdrawn at the rate of 18.9 pounds per minute (approximately 69% paraxylene either as crystals or in solution in isopentane). This slurry is heated and fractionated by conventional distillation into isopentane and a xylene product containing 99.5% paraxylene. From the top of the rotating disc contactor a raffinate-isopentane mixture is withdrawn at the rate of 92.9 pounds per minute and is also fractionated by conventional distillation into isopentane and a raffinate containing approximately 5.7% paraxylene. The isopentane fractions from the two distillations are combined, cooled to −75° C. and returned to the bottom of rotating disc contactor at the rate of 11.8 pounds per minute as wash liquid (in part as transport liquid for the crystals leaving the bottom of the rotating disc contactor).

EXAMPLE V

A feed is employed comprising an aromatics mixture obtained from platformate which contains approximately, by weight, 18% paraxylene, 16% orthoxylene, 43% metaxylene, 23% ethylbenzene. A conventional first stage crystallization followed by a centrifuge or filter step produces a mixture having approximately 70% by weight of paraxylene which is the feed to a final stage which comprises washing in a rotating disc contactor. The washing zone operating within a temperature range of approximately −10° C. at the top and approximately 13° C. at the bottom produces a bottom product containing 99.9% by weight of paraxylene and an overhead raffinate containing about 50% paraxylene. The ratio of reflux to paraxylene product recovered at the bottom of the rotating disc contactor is approximately 0.8. The overhead raffinate is recycled to the first stage step for further paraxylene recovery.

The importance of the reflux ratio in producing product purity is illustrated by the following data which are based on several tests run according to the process of the instant invention.

TABLE I.—PRODUCT PURITY VERSUS REFLUX RATE

|  | Run 1 | Run 2 | Run 3 | Run 4 |
|---|---|---|---|---|
| Paraxylene product off-take, grams per minute | 43 | 43 | 56 | 69 |
| Reflux/off-take ratio | 0.82 | 0.79 | 0.58 | 0.48 |
| P-xylene purity, percent by weight | 99.9 | 99.8 | 98.8 | 96.9 |

NOTE.—Crystal size=0.5×1.0 millimeter, rotating disc contactor 2 inch diameter.

We claim as our invention:

1. A continuous process for the recovery of paraxylene from a multicomponent liquid feed mixture comprising from about 9 to 98% by weight of paraxylene in admixture with compounds having a melting point below that of paraxylene which comprises:
   (a) subjecting said mixture to a temperature sufficient to form a slurry comprising a crystal phase consisting of paraxylene and a liquid phase comprising the remaining liquid components of said feed and some paraxylene;
   (b) separating said slurry into two portions, the liquid portion which comprises a liquid reject and substantially no crystals and a crystal portion which comprises crystals and some residual contaminating liquid from the feed;
   (c) introducing said crystal portion to a washing zone which comprises a cylindrical column containing a series of subzones with means for producing toroidal flow to liquid contents of said subzones;
   (d) introducing a washing liquid into said washing zone countercurrent to the flow of said crystal portion;
   (e) intimately contacting said crystal portion as separate and distinct particles with said washing liquid in a toroidal flow pattern;
   (f) recovering a liquid overhead comprising some washing liquid and residual contaminating liquid from said feed; and
   (g) recovering a paraxylene product.

2. The process of claim 1 wherein said multicomponent liquid feed mixture is a hydrocarbon platformate fraction.

3. The process of claim 1 wherein said multicomponent liquid feed mixture is a hydrocarbon mixture produced by the dehydrocoupling and cycling of lower aliphatic hydrocarbons.

4. The process of claim 1 wherein the paraxylene product comprises at least about 99% paraxylene by weight.

5. The process of claim 1 wherein the paraxylene product comprises about 99.9% paraxylene by weight.

6. The process of claim 1 wherein the initial feed mixture is first introduced to the process as a secondary washing liquid in the washing zone.

7. A continuous process for the separation of paraxylene from an initial liquid hydrocarbon multicomponent feed mixture which comprises:
   (a) subjecting said mixture to a temperature at which a slurry comprising a crystal phase consisting of paraxylene and a liquid phase comprising the remaining components of said feed and some paraxylene is formed;
   (b) separating said slurry into two portions, the liquid portion which comprises liquid and substantially no crystals and a crystal portion which comprises crystals and some residual contaminating liquid;
   (c) introducing that part of said crystal portion in which the individual crystals have a diameter of at least about .3 millimeter to the upper portion of a washing zone which comprises a cylindrical column containing a series of subzones with means for producing toroidal flow to liquid contents of said subzones;
   (d) introducing to a lower portion of said washing zone, countercurrent to the descending crystal portion, a washing liquid comprising initially at least 99.8% by weight of paraxylene;
   (e) effecting intimate contact of said crystal portion as separate and distinct particles with said washing liquid in a toroidal flow pattern;
   (f) recycling an overhead liquid comprising washing liquid and residual contaminating liquid to said initial feed mixture;
   (g) recovering a product comprising at least 99.8% by weight of paraxylene.

8. The process of claim 2 wherein the weight ratio of washing liquid to paraxylene product is maintained at at least about 2/3.

9. A continuous process for the separation of paraxylene from an initial liquid hydrocarbon multicomponent feed mixture which comprises:
   (a) subjecting said mixture to a temperature at which a slurry comprising a crystal phase consisting of paraxylene and a liquid phase comprising the remaining components including some paraxylene of said feed is formed;
   (b) separating said slurry into two portions, the liquid portion of which comprises liquid and substantially no crystals and a crystal portion which comprises crystals and some residual contaminating liquid;
   (c) introducing said crystal portion into the upper portion of a washing zone which comprises a cylindrical column containing a series of subzones with means for producing toroidal flow to liquid contents of said subzones;
   (d) introducing into the lower portion of said washing zone, countercurrent to said descending crystal portion a washing liquid comprising a liquid not present initially in the feed;
   (e) intimately contacting said crystal portion as separate and distinct particles with said washing liquid in a toroidal flow pattern;
   (f) recovering overhead from said washing zone a liquid comprising washing liquid and residual contaminating liquid from the feed;
   (g) obtaining a product stream from the lower portion of the washing zone comprising paraxylene, washing liquid, and substantially no contaminating liquid from the initial feed;
   (h) separately recovering washing liquid from the liquid overhead and product streams and recycling said washing liquid to washing zone.

10. The process of claim 9 wherein said washing liquid is a low molecular weight hydrocarbon.

11. The process of claim 9 wherein the temperature referred to in (a) is effected by direct contact refrigeration by contacting with a solvent and evaporating said solvent.

12. The process of claim 9 wherein the temperature referred to in (a) is effected by direct contact refrigeration by contacting the feed mixture with the same washing liquid used in (d) and evaporating said washing liquid.

13. The process of claim 9 wherein said washing liquid comprises isopentane.

14. In a process for the recovery of high purity paraxylene from a multicomponent mixture by crystallization of the paraxylene and washing said paraxylene crystals free of residual components from the mixture in a washing zone, the improvement which comprises:
   (a) sending only crystals of paraxylene having a diameter of at least about .3 millimeter to said washing zone; and (b) intimately contacting the crystals as separate and distinct particles in a toroidal flow pattern with a washing liquid comprising at least 99.8% by weight paraxylene in said washing zone.

15. A continuous process for the purification of organic materials of different melting temperatures which comprises:
    (a) subjecting a mixture of said materials to a temperature sufficient to form a slurry comprising a solid phase of substantially pure material and a liquid phase comprising the remaining liquid components of said mixture;
    (b) separating said slurry into two portions, the liquid reject and substantially no crystals and a crystal portion which comprises crystals and some residual contaminating liquid from the feed mixture;
    (c) introducing said crystal portion to a washing zone which comprises a cylindrical column containing a series of subzones with means for producing toroidal flow to liquid contents of said subzones;
    (d) introducing a washing liquid into said column countercurrent to the flow of said crystal portion;
    (e) intimately contacting said crystal portion as separate and distinct particles with said washing liquid in a toroidal flow pattern;
    (f) recovering a liquid comprising some washing liquid and residual contaminating liquid from said feed and;
    (g) recovering a product substantially free of residual contaminating liquid comprising wash liquid and material of the said crystal composition.

References Cited

UNITED STATES PATENTS

| | | | |
|---|---|---|---|
| 2,601,674 | 6/1952 | Reman | 23—270.5 |
| 2,898,271 | 8/1959 | Findlay | 260—674 |
| 2,533,232 | 12/1950 | Dressler | 260—674 |
| 2,683,178 | 7/1954 | Findlay | 260—674 |
| 2,780,663 | 2/1957 | Gunness | 260—674 |
| 2,795,635 | 6/1957 | McBride | 260—674 |
| 2,813,099 | 11/1957 | Weedman | 260—674 |
| 3,062,627 | 11/1962 | Zuiderweg | 23—270.5 |

DELBERT E. GANTZ, *Primary Examiner.*

C. E. SPRESSER, *Assistant Examiner.*